(12) United States Patent
Huang

(10) Patent No.: US 6,769,657 B1
(45) Date of Patent: *Aug. 3, 2004

(54) SUPPORT DEVICE FOR MONITOR, DISPLAY OR OBJECTS

(76) Inventor: Min Hwa Huang, P.O. Box 63-99, Taichung (TW), 406

( * ) Notice: Subject to any disclaimer, the term of this patent is extended or adjusted under 35 U.S.C. 154(b) by 0 days.

This patent is subject to a terminal disclaimer.

(21) Appl. No.: 10/412,774

(22) Filed: Apr. 9, 2003

(51) Int. Cl.⁷ .............................................. E04G 3/00
(52) U.S. Cl. .............................. 248/278.1; 248/284.1; 248/278.1; 248/917; 248/922
(58) Field of Search ............................ 248/284.1, 278.1, 248/276.1, 279.1, 283.1, 286.1, 231.71, 917, 919, 922, 921, 274.1

(56) References Cited

U.S. PATENT DOCUMENTS

| | | | | |
|---|---|---|---|---|
| 4,695,024 A | * | 9/1987 | Haven | 248/281.11 |
| 5,553,820 A | * | 9/1996 | Karten et al. | 248/286.1 |
| 5,713,549 A | * | 2/1998 | Shieh | 248/284.1 |
| 5,799,917 A | * | 9/1998 | Li | 248/284.1 |
| 5,975,472 A | * | 11/1999 | Hung | 248/278.1 |
| 6,012,693 A | * | 1/2000 | Voeller et al. | 248/280.11 |
| 6,027,090 A | * | 2/2000 | Liu | 248/281.11 |
| 6,116,557 A | * | 9/2000 | Choy et al. | 248/286.1 |
| 6,199,809 B1 | * | 3/2001 | Hung | 248/284.1 |
| 6,315,259 B1 | * | 11/2001 | Kolb | 248/276.1 |
| 6,394,403 B1 | * | 5/2002 | Hung | 248/276.1 |
| 6,398,176 B1 | * | 6/2002 | Liu | 248/284.1 |
| 6,478,275 B1 | | 11/2002 | Huang | 248/284.1 |
| 6,533,229 B1 | * | 3/2003 | Hung | 248/286.1 |

* cited by examiner

*Primary Examiner*—Kimberly Wood

(57) ABSTRACT

A support device includes an arm having a lower shaft pivotally secured to a base, and an upper axle pivotally secured to a bracket and a curved channel formed around the axle. A lever has a lower rod pivotally secured to the base and a curved groove formed around the rod for slidably receiving the shaft, and has an upper fastener pivotally secured to the bracket and slidably received in the curved channel of the arm. A stem is rotatably attached between the rod and the fastener. A locking device may lock the stem and the lever and the arm and the bracket together, to secure and support the bracket or various objects at selected position.

8 Claims, 4 Drawing Sheets

SUPPORT DEVICE FOR MONITOR, DISPLAY OR OBJECTS

BACKGROUND OF THE INVENTION

1. Field of the Invention

The present invention relates to a support device, and more particularly to a support device for supporting monitors, display members, screens, or other objects.

2. Description of the Prior Art

Various kinds of typical support devices have been developed to support monitors, display members, screens, or other objects, and comprise a parallelogrammic structure for rotatably supporting various objects, and for adjusting the objects upwardly and downwardly to any suitable or selected heights or positions, and for adjusting the parallelogrammic structure and thus the objects at the selected heights or positions.

The applicant has also developed a similar typical support device for adjustably supporting monitors, display members, screens, or other objects at any suitable or selected heights or positions. The typical support device has been allowed and issued as U.S. Pat. No. 6,478,275 B1 to Huang, and also comprises a parallelogrammic structure for rotatably supporting various objects, and for adjusting the objects upwardly and downwardly to any suitable or selected heights or positions, and for adjusting the parallelogrammic structure and thus the objects at the selected heights or positions.

However, the typical parallelogrammic support devices have no lock device to lock the parallelogrammic support device at the required or suitable or selected positions or heights.

The present invention has arisen to mitigate and/or obviate the afore-described disadvantages of the conventional adjustable support devices.

SUMMARY OF THE INVENTION

The primary objective of the present invention is to provide a support device for supporting monitors, display members, screens, or other objects, and having a lock device to lock the parallelogrammic support device at the required or suitable or selected positions or heights.

In accordance with one aspect of the invention, there is provided a support device comprising a base, a bracket for supporting an object, an arm including a lower portion pivotally secured to the base with a shaft, and including an upper portion pivotally secured to the bracket with an axle, and including a curved channel formed therein and formed around the axle, a lever including a lower portion pivotally secured to the base with a rod, and including a curved groove formed in the lower portion thereof and formed around the rod for slidably receiving the shaft and for allowing the lever to be rotated relative to the base, the lever including an upper portion pivotally secured to the bracket with a fastener, the fastener being slidably received in the curved channel of the arm for allowing the upper portion of the lever and the fastener to be rotated relative to the arm about the axle, a stem including a lower portion having an aperture formed therein to rotatably receive the rod, and an upper portion having an orifice formed therein to rotatably receive the fastener, and a locking device provided for locking the upper portion of the stem and the lever and the arm and the bracket together, to secure and support the bracket at selected position.

The locking device includes a lock member having an inner thread formed therein, and includes an outer thread provided on the fastener and threaded with the inner thread of the lock member, to lock the upper portion of the stem and the lever and the arm and the bracket together.

The lock member includes a handle provided thereon for rotating the lock member relative to the fastener and the arm. The fastener includes a peripheral shoulder formed therein to engage with the stem, and to position the fastener relative to the stem.

The base includes a stop secured thereto, the lever includes a cam surface provided in the lower portion thereof to engage with the stop, and to limit a rotational movement of the lever relative to the base.

The arm includes a curved passage formed in the lower portion thereof to slidably receive the stop. The arm includes a downwardly curved flap provided on the lower portion thereof to form and define the curved passage of the arm.

A coupler may further be provided and pivotally secured to the bracket with a first pin, and a frame is pivotally secured to the coupler with a second pin, the first pin is offset and perpendicular to the second pin, to allow the frame to be rotated and adjusted relative to the bracket.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
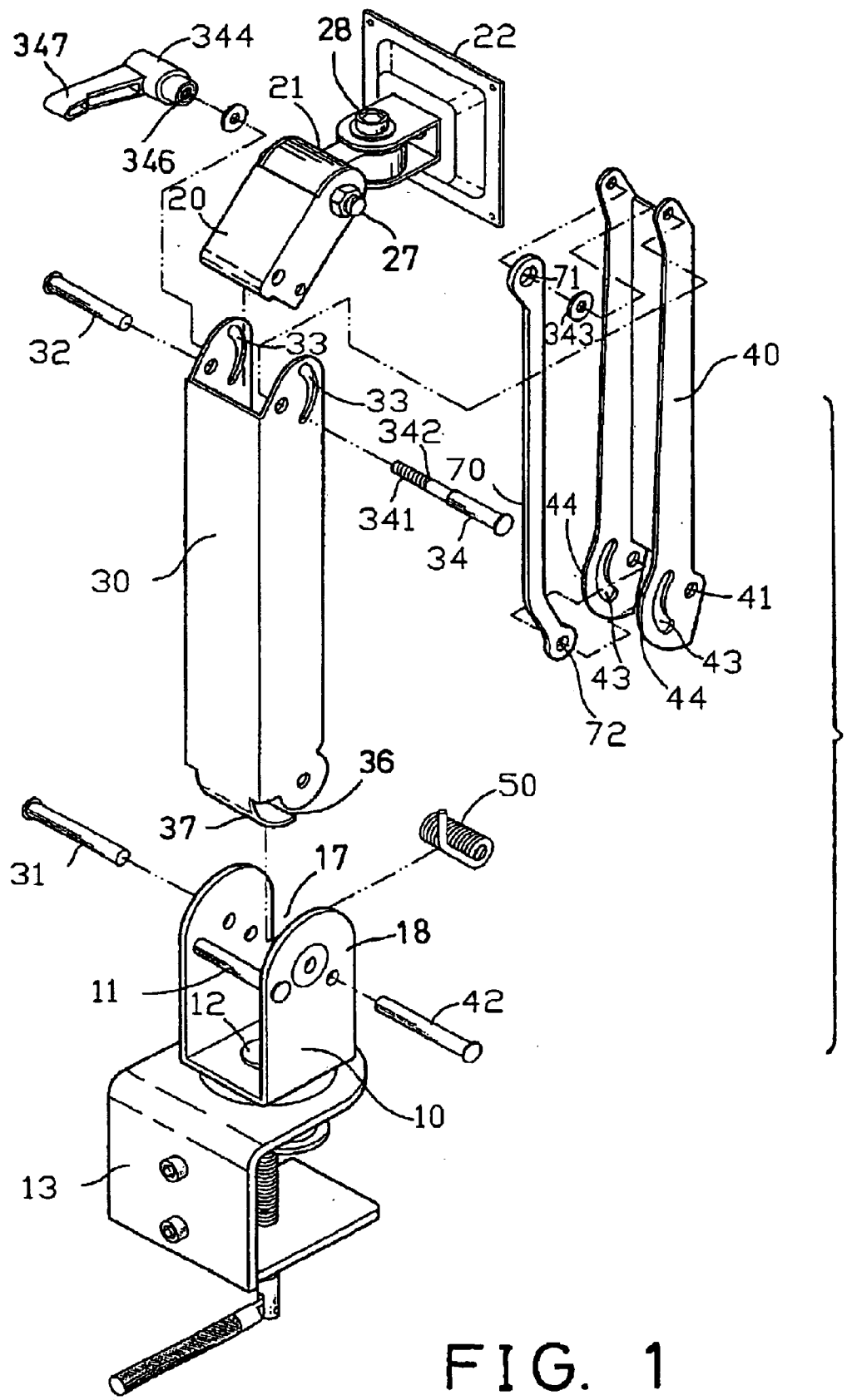
FIG. 1 is a partial exploded view of a support device in accordance with the present invention.
Figure 2:
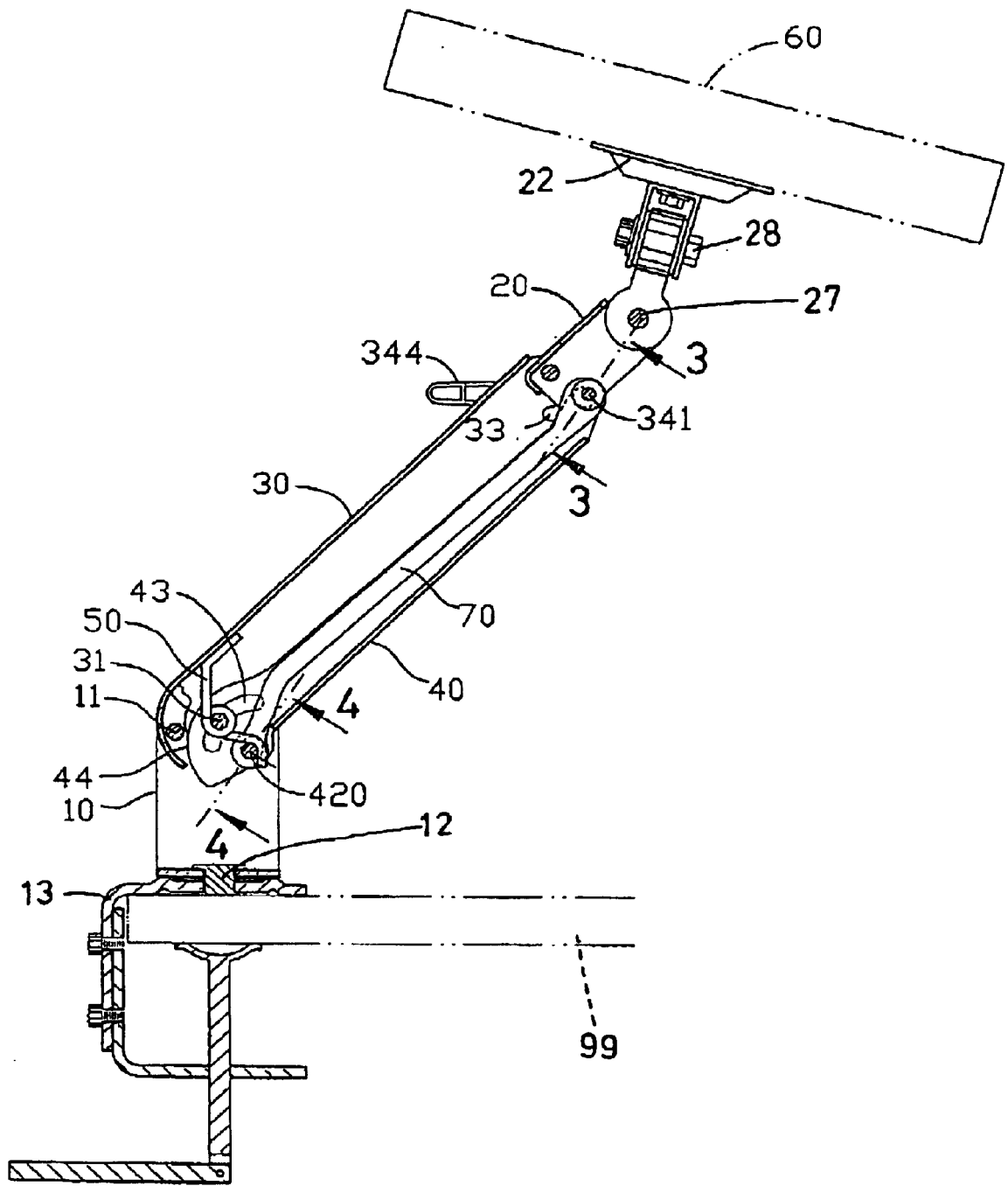
FIG. 2 is a partial cross sectional view of the support device.

Referring to the drawings, and initially to FIGS. 1 and 2, a support device in accordance with the present invention comprises a base 10 including a U-shaped structure having a space 17 formed or defined between two spaced walls 18, and including a lower portion pivotally or rotatably secured to a frame or fastener or clamp 13 or the like with a pivot spindle 12, for allowing the base 10 to be rotated relative to the base 13 to any required position.

The clamp 13 may be attached or secured to any support member, such as table 99 (FIG. 2) or the like. A stop 11 is secured in the base 10, such as secured between the upper portion of the walls 18 and located at the upper portion of the walls 18, and laterally extended through the space 17 of the base 10.

A frame or an arm 30 includes a lower portion received in the space 17 of the base 10 and pivotally or rotatably secured to the base 10 with a shaft 31, and includes an upper portion having an axle 32 secured therein, and having one or more curved channels 33 formed in the upper portion thereof and formed or provided around he axle 32, to arrange the axle 32 at the center of curvature of the curved channels 33 of the arm 30.

The arm 30 includes a curved passage 36 formed or provided in the bottom portion thereof and defined by a downwardly curved flap 37 and provided around the shaft 31, to arrange the shaft 31 at the center of curvature of the curved passage 36 of the arm 30. The stop 11 is relatively and slidably received in the curved passage 36 of the arm 30, to limit the rotational movement of the arm 30 relative to the base 10.

A lever 40 includes an orifice 41 formed in the lower portion thereof for rotatably receiving a rod 42 and for pivotally or rotatably secured to the base 10 with the rod 42. The lever 40 includes a curved groove 43 formed in the lower portion thereof and formed or provided around the orifice 41 thereof and/or around the rod 42, to slidably receive the shaft 31 and to limit the rotational movement of the lever 40 relative to the base 10.

The lever 40 includes a curved or peripheral or cam surface 44 formed or provided on the outer peripheral portion thereof, to engage with the stop 11, and to further limit the rotational movement of the lever 40 relative to the base 10, and to prevent the lever 40 from being over-rotated downwardly relative to the base 10. A spring 50 is engaged on the shaft 31 and engaged between the rod 42 and the arm 30, for biasing the arm 30 toward the upright position.

A bracket 20 includes a lower portion pivotally or rotatably secured to the upper portion of the arm 30 with the axle 32. A fastener 34 is engaged through the lower portion of the bracket 20 and is slidably engaged in the curved channels 33 of the arm 30, to guide and to limit the rotational movement of the bracket 20 relative to the arm 30.

The fastener 34 is also secured to the upper portion of the lever 40, and is slidably received in the curved channels 33 of the arm 30, such that the arm 30 and the lever 40 and the axle 32 and the fastener 34 and the shaft 31 and the rod 42 may thus form a parallelogrammic structure for allowing the arm 30 and the lever 40 to be rotated relative to each other, and to be rotated relative to the base 10.

A coupler 21 includes one end pivotally or rotatably secured to the bracket 20 with a pivot pin or fastener 27, for allowing the coupler 21 to be rotated or adjusted relative to the bracket 20 to any suitable or selected angular position. The other end of the coupler 21 is pivotally or rotatably secured to another frame 22 with a pivot pin or fastener 28 that is offset and perpendicular to the fastener 27, for allowing the frame 22 to be rotated or adjusted relative to the coupler 21 to any suitable or selected angular position.

The frame 22 may be secured to any objects 60, such as monitors, display members, screens, or other objects, in order to support the objects 60 at any suitable or selected angular position by the parallelogrammic structure that is formed or defined by the arm 30 and the lever 40 and the axle 32 and the fastener 34 and the shaft 31 and the rod 42.

The above described structure of the support device has been fully disclosed in the applicant's prior U.S. Pat. No. 6,478,275 B1 to Huang, which is thus taken as a reference for the present invention.

Figure 3:
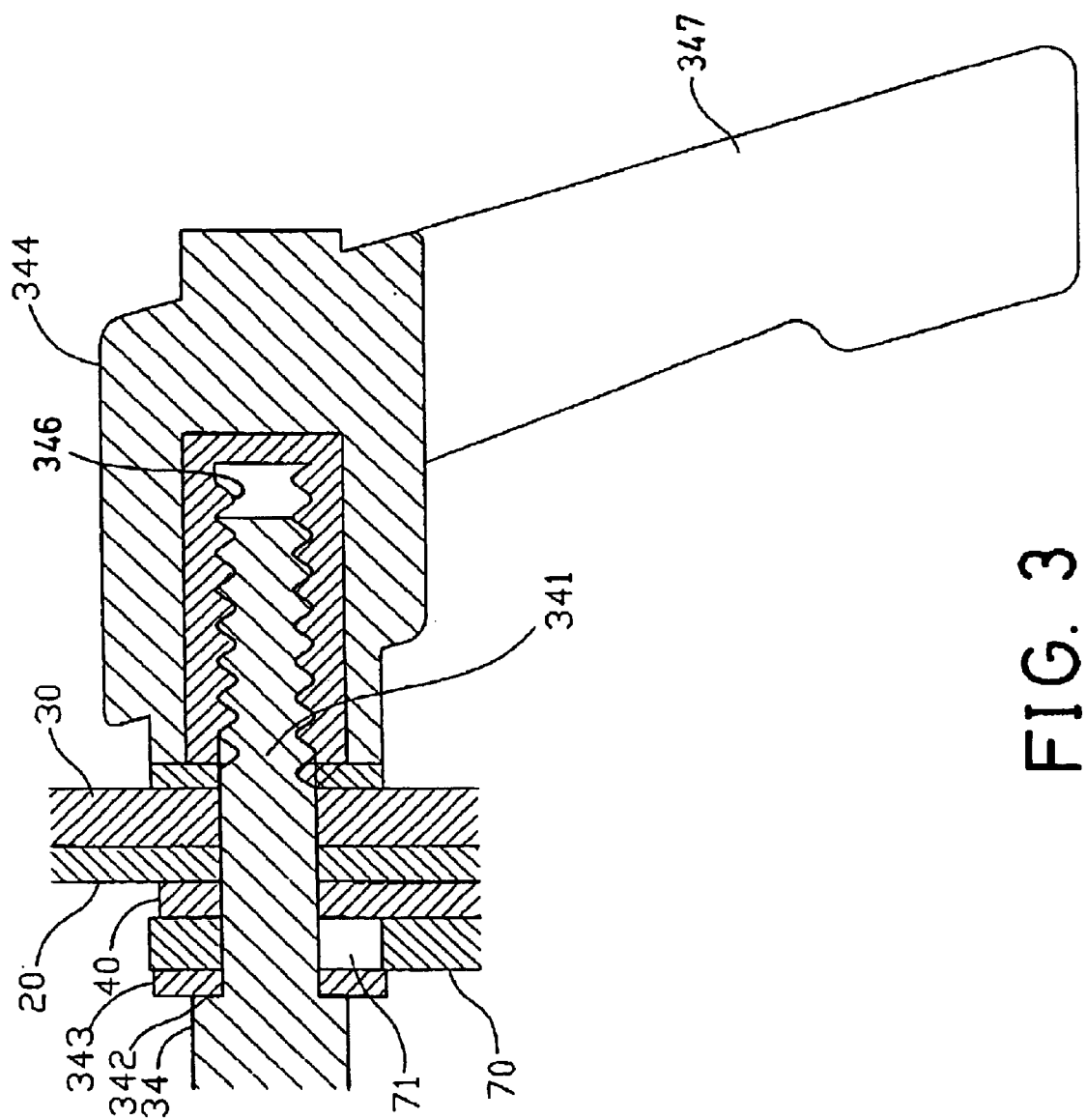
FIGS. 3, 4 are partial cross sectional views of the support device, taken along lines 3—3 and 4—4 of FIG. 2 respectively.
Figure 4:
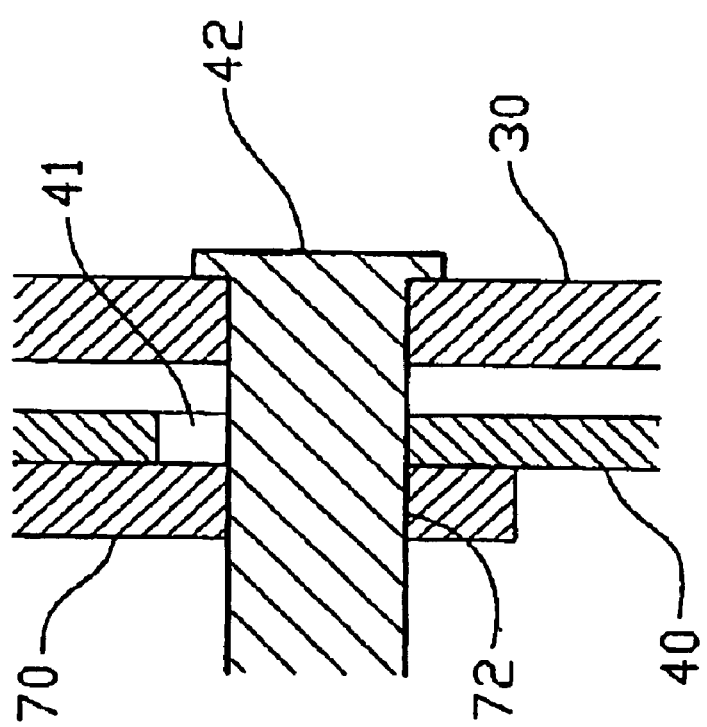

The support device in accordance with the present invention further includes a stem 70 having an aperture 72 formed in the lower end thereof, to rotatably receive the rod 42 (FIG. 4), and having an orifice 71 formed in the upper end thereof, to rotatably receive the fastener 34 which is slidably engaged in the curved channels 33 of the arm 30 (FIG. 3). One or more washers 343 may further be provided and engaged onto the fastener 34, and engaged between the fastener 34 and/or the stem 70 and/or the arm 30.

The fastener 34 includes an outer thread 341 formed or provided on one end thereof, for threading with an inner thread 346 of a lock member 344 which includes a handle 347 for rotating the lock member 344 relative to the fastener 34 and/or the arm 30 and/or the bracket 20 and/or the coupler 21. The fastener 34 includes a peripheral shoulder 342 formed therein to engage with the washer 343 or the stem 70, and to position the fastener 34 relative to the stem 70, and to solidly lock or secure the upper portion of the stem 70 and the lever 40 and the bracket 20 and the arm 30 together, best shown in FIG. 3.

In operation, after the objects 60 have been supported and adjusted to at any suitable or selected angular position or height by the parallelogrammic structure that is formed or defined by the arm 30 and the lever 40 and the axle 32 and the fastener 34 and the shaft 31 and the rod 42, the lock member 344 may solidly lock or secure the stem 70 and the lever 40 and the bracket 20 and the arm 30 together with the fastener 34, such that the objects 60 may be adjusted and supported at any suitable or selected angular position or height.

Accordingly, the support device in accordance with the present invention includes a lock device to lock the parallelogrammic support device at the required or suitable or selected positions or heights, and thus to support various objects, such as monitors, display members, screens, or other objects, at the required or suitable or selected positions or heights.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A support device comprising:
    a base,
    a bracket for supporting an object,
    an arm including a lower portion pivotally secured to said base with a shaft, and including an upper portion pivotally secured to said bracket with an axle, and including a curved channel formed therein and formed around said axle,
    a lever including a lower portion pivotally secured to said base with a rod, and including a curved groove formed in said lower portion thereof and formed around said rod for slidably receiving said shaft and for allowing said lever to be rotated relative to said base, said lever including an upper portion pivotally secured to said bracket with a fastener, said fastener being slidably received in said curved channel of said arm for allowing said upper portion of said lever and said fastener to be rotated relative to said arm about said axle,
    a stem including a lower portion having an aperture formed therein to rotatably receive said rod, and an upper portion having an orifice formed therein to rotatably receive said fastener, and
    means for locking said upper portion of said stem and said lever and said arm and said bracket together, to secure and support said bracket at selected position.

2. The support device as claimed in claim 1, wherein said locking means includes a lock member having an inner thread formed therein, and includes an outer thread provided on said fastener and threaded with said inner thread of said lock member, to lock said upper portion of said stem and said lever and said arm and said bracket together.

3. The support device as claimed in claim 2, wherein said lock member includes a handle provided thereon for rotating said lock member relative to said fastener and said arm.

4. The support device as claimed in claim 1, wherein said fastener includes a peripheral shoulder formed therein to engage with said stem, and to position said fastener relative to said stem.

5. The support device as claimed in claim 1, wherein said base includes a stop secured thereto, said lever includes a cam surface provided in said lower portion thereof to engage with said stop, and to limit a rotational movement of said lever relative to said base.

6. The support device as claimed in claim 1, wherein said base includes a stop secured thereto, said arm includes a curved passage formed in said lower portion thereof to slidably receive said stop.

7. The support device as claimed in claim 6, wherein said arm includes a downwardly curved flap provided on said lower portion thereof to form and define said curved passage of said arm.

8. The support device as claimed in claim 1 further comprising a coupler pivotally secured to said bracket with a first pin, and a frame pivotally secured to said coupler with a second pin, said first pin being offset and perpendicular to said second pin, to allow said frame to be rotated and adjusted relative to said bracket.

* * * * *